(12) United States Patent
Schilling et al.

(10) Patent No.: US 10,925,207 B2
(45) Date of Patent: Feb. 23, 2021

(54) DEPTH ADJUSTMENT SYSTEM WITH ADJUSTABLE MOUNT

(71) Applicant: CNH Industrial Canada, Ltd., Saskatoon (CA)

(72) Inventors: Robin Bruno Schilling, Darfield (CA); Jared S. Wright, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 171 days.

(21) Appl. No.: 16/107,816

(22) Filed: Aug. 21, 2018

(65) Prior Publication Data

US 2020/0060073 A1 Feb. 27, 2020

(51) Int. Cl.
*A01C 7/20* (2006.01)
*A01B 63/00* (2006.01)
*A01C 5/06* (2006.01)

(52) U.S. Cl.
CPC ............ *A01C 7/203* (2013.01); *A01B 63/008* (2013.01); *A01C 5/064* (2013.01); *A01C 5/068* (2013.01)

(58) Field of Classification Search
CPC ........... A01C 7/203; A01C 7/201; A01C 7/20; A01C 5/064; A01C 5/062; A01C 5/06; A01C 5/00; A01C 5/068; A01C 5/066; A01B 63/008; A01B 63/002; A01B 63/00
See application file for complete search history.

(56) References Cited

U.S. PATENT DOCUMENTS

| | | |
|---|---|---|
| 2,754,647 A | 7/1956 | Bennett et al. |
| 2,785,613 A | 3/1957 | Staats, Sr. |
| 3,047,122 A | 7/1962 | Rosetz |
| 3,306,240 A | 2/1967 | Ritchie |
| 4,273,057 A | 6/1981 | Pollard |
| 4,307,674 A | 12/1981 | Jennings et al. |
| 4,373,456 A | 2/1983 | Westerfield |
| 4,423,788 A | 1/1984 | Robinson, Jr. et al. |
| 4,760,806 A | 8/1988 | Bigbee et al. |
| 4,796,550 A | 1/1989 | Van Natta et al. |
| 5,234,060 A | 8/1993 | Carter |
| 5,544,709 A | 8/1996 | Lowe et al. |
| 5,641,026 A | 6/1997 | Balmer |
| 5,829,535 A | 11/1998 | Line |
| 6,454,019 B1 | 9/2002 | Prairie et al. |
| 6,659,193 B1 | 12/2003 | Best et al. |
| 7,191,715 B2 | 3/2007 | Wendte et al. |
| 7,360,494 B2 | 4/2008 | Martin |
| 7,481,278 B1 | 1/2009 | Pomedli et al. |
| 7,597,055 B2 | 10/2009 | Choulet |
| 8,186,287 B2 | 5/2012 | Schilling et al. |
| 8,550,020 B2 | 10/2013 | Sauder et al. |
| 8,635,962 B2 | 1/2014 | Schilling |
| 9,148,989 B2 | 10/2015 | Van Buskirk et al. |
| 2014/0303854 A1 | 10/2014 | Zielke |

FOREIGN PATENT DOCUMENTS

| | | |
|---|---|---|
| DE | 3902709 A1 | 8/1989 |
| EP | 0172358 A2 | 6/1985 |
| GB | 335614 | 9/1930 |

*Primary Examiner* — Christopher J. Novosad
(74) *Attorney, Agent, or Firm* — Rebecca L. Henkel; Rickard K. DeMille (57) ABSTRACT

An agricultural implement system that includes a mount system that couples to a row unit. The mount system supports a depth adjustment system that adjusts a depth of an opener relative to a soil surface. The mount system includes a plate that couples to the row unit in a plurality of positions to change an orientation of the depth adjustment system relative to the row unit.

7 Claims, 8 Drawing Sheets

DEPTH ADJUSTMENT SYSTEM WITH ADJUSTABLE MOUNT

BACKGROUND

The present disclosure relates to agricultural equipment.

Seeding implements are typically towed behind a tractor or other work vehicle. For example, a tongue of the seeding implement may be connected to a drawbar of the tractor, or a mast of the seeding implement may be connected to a hitch of the tractor. In order to plant the seeds, the seeding implements typically include a ground engaging tool or opener that forms a trench for seed deposition into the soil. As the implement travels across a field, the opener excavates a trench into the soil, and seeds are deposited into the trench.

BRIEF DESCRIPTION

In one embodiment, an agricultural implement system that includes an agricultural implement and a row unit. An opener couples to the row unit. The row unit forms a trench in soil. The system includes a packer wheel that passes over the trench and packs the soil. A depth adjustment system coupled to the row unit that adjusts a depth of the opener relative to a surface of the soil. A mount system couples to the row unit and supports the depth adjustment system. The mount system includes a plate that couples to the row unit in a plurality of positions to change an orientation of the depth adjustment system relative to the row unit.

In another embodiment, an agricultural implement system that includes a mount system that couples to a row unit. The mount system supports a depth adjustment system that adjusts a depth of an opener relative to a soil surface. The mount system includes a plate that couples to the row unit in a plurality of positions to change an orientation of the depth adjustment system relative to the row unit.

In another embodiment, an agricultural implement system that includes a depth adjustment system that couples to a row unit and that adjusts a depth of an opener relative to a soil surface. The depth adjustment system includes a cam that rotates about an axis and a cam follower that contacts the cam and adjusts a position of a packer wheel to adjust the position of the opener. The system also includes a mount system that couples to the row unit. The mount system supports the depth adjustment system that adjusts the position of the opener relative to a soil surface. The mount system includes a plate that couples to the row unit in a plurality of positions to change an orientation of the depth adjustment system relative to the row unit.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Modern farming uses a variety of agricultural implements to harvest crops, prepare the soil for planting, and for planting. These agricultural implements are commonly referred to as harvesters, tillers, and planters. Planters enable seed planting by first opening a trench in the soil with an opening system. The planter then deposits seeds into the trench, after which the trench is covered with soil by a closing system. In order to optimize yields of some crops, there may be an optimal depth below the surface for seed deposition and/or fertilizer deposition. This distance may ensure that the plants in each row are close enough to the surface to grow as well as have sufficient contact with soil to receive nutrients. Or in the case of fertilizer placement, deposition of fertilizer at a depth that nourishes the growing plant. In order to control the depth at which the trench is formed, the agricultural implement may include a depth adjustment mechanism that adjusts the distance an opener or ground engaging tool penetrates below the surface of the soil.

Figure 1:
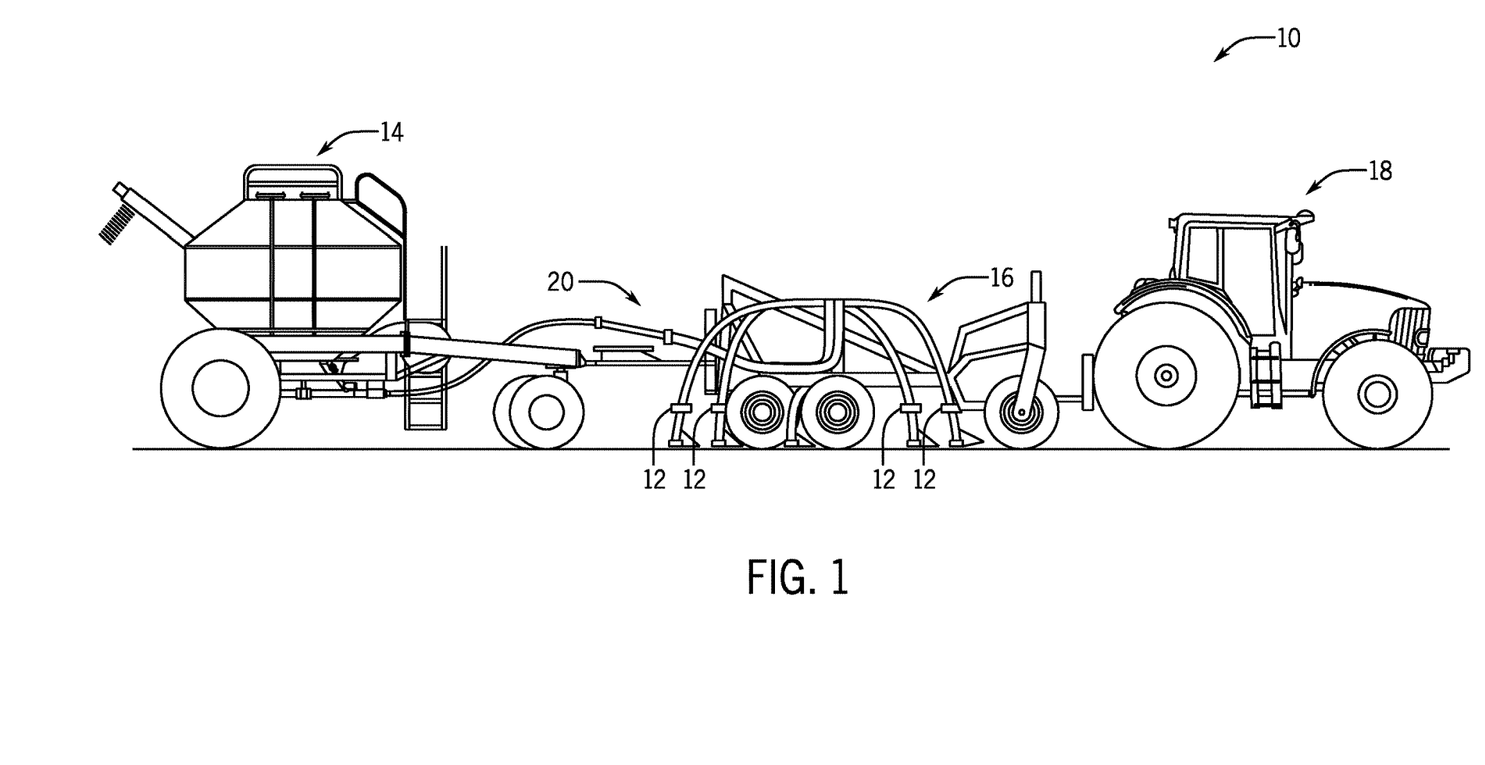
FIG. 1 is a side view of an embodiment of an agricultural system.

Turning now to the drawings, FIG. 1 is a schematic view of an embodiment of an agricultural system 10 with a depth adjustment system 12. The agricultural system 10 includes an air cart 14, an agricultural implement 16, and a work vehicle 18 (e.g., tractor). The work vehicle 18 is coupled to the implement 16 and is used to tow the air cart 14 and the implement 16. The air cart 14 couples to the implement 16 and distributes agricultural product (e.g., seeds, fertilizer, etc.) to the implement 16 using a blower, such as a fan, and a metering system, which may include a series of meter rollers. The implement 16 includes multiple row units 20 that may be organized into one or more rows. The row units 20 use the depth adjustment system 12 to control the depth at which openers/ground engaging tools on the row units 20 penetrate the soil. The depth adjustment system 12 includes a mount system that enables an operator to change the orientation of the depth adjustment system 12. For example, each row of the row units 20 may have their respective depth adjustment systems 12 oriented differently (i.e., at different angles) to facilitate access to the depth adjustment systems 12. This enables an operator to change the penetration depth of the openers on the row units 20 depending on the type of seed being planting, soil conditions, type of fertilizer, etc.

Figure 2:
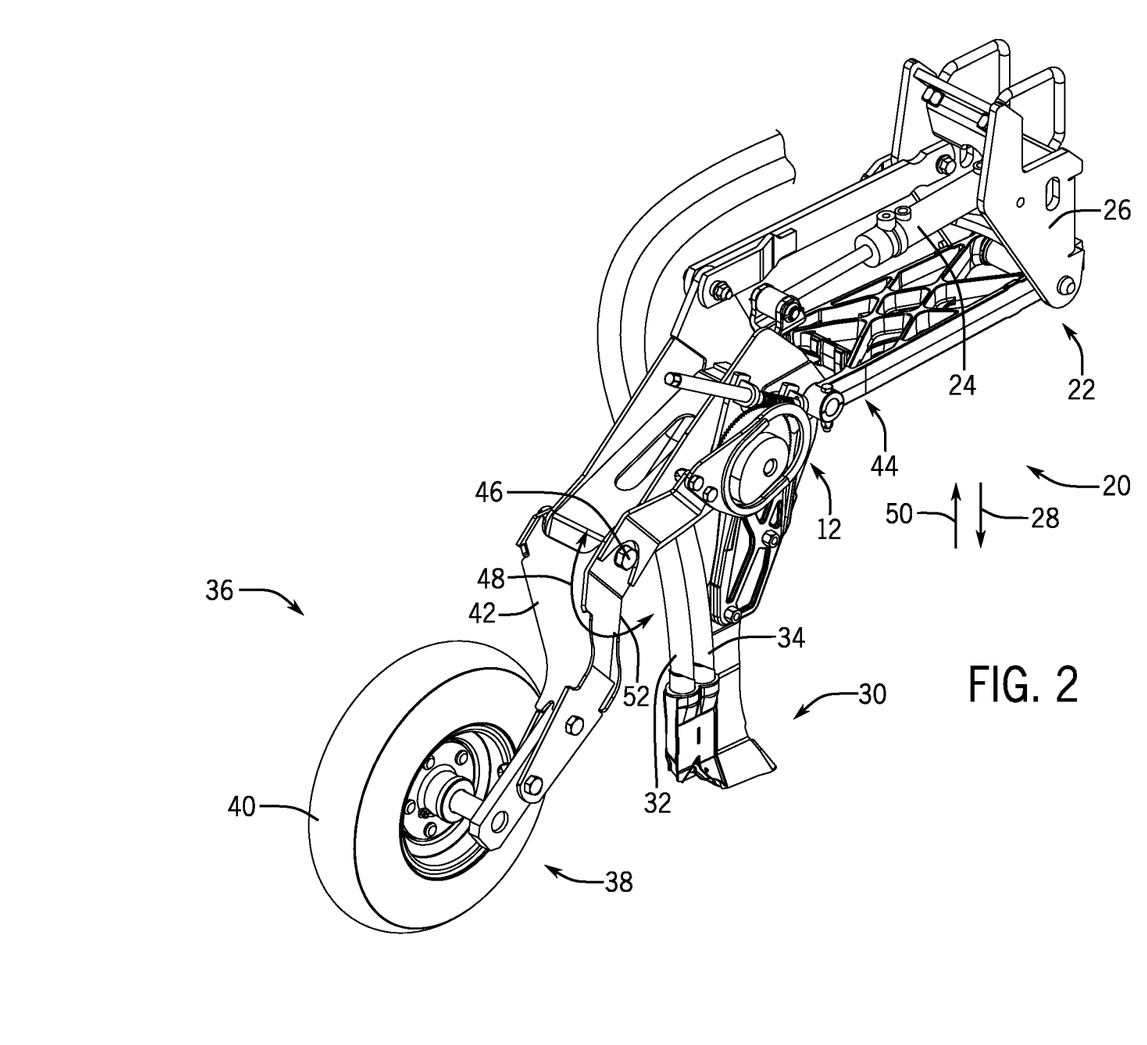
FIG. 2 is a perspective view of an embodiment of a row unit of the agricultural implement in FIG. 1 with a depth adjustment system.

FIG. 2 is a perspective view of an embodiment of the row unit 20 of the agricultural implement in FIG. 1 with the depth adjustment system 12. As illustrated, the row unit 20 includes a linkage assembly 22, configured to couple the row unit 20 to a tool bar. In operation, the linkage assembly 22 enables vertical movement of the row unit 20 as the implement 16 travels across uneven ground in order to maintain contact between the row unit 20 and the soil. In some embodiments, the row unit 20 may include a down force actuator 24 that extends between a mounting bracket 26 that provides a downforce on the row unit 20 to maintain contact between the row unit 20 and the soil. The down force actuator 24 is configured to apply a force to the row unit 20 that drives the row unit 20 in a direction 28 (e.g., downward), thereby driving a ground engaging tool 30 into the soil. The ground engaging tool 30 may also be referred to as a shank or opener. The level of down force may vary based on soil type, the degree of tillage applied to the soil, soil moisture content, amount of residue cover, and/or tool wear, among other factors. Because such factors may vary from one side of the implement 16 to the other, a different level of down force may be selected for each row unit 20.

The level of down force may also be dependent on the speed at which the row unit 20 is pulled across the field. For example, as speed increases, the ground engaging tools 30 may have a tendency to rise out of the ground due to the interaction between the soil and the tool. A greater down force may therefore be applied during higher speed operation to ensure that the ground engaging tools 30 remain at a desired depth. Because each row unit 20 includes an independent down force actuator 24, the contact force may vary across the implement 16, thereby establishing a substantially uniform seed deposition depth across the field. In some embodiments, the down force actuator 24 may retract to apply an upward force. For example, in some environments the agricultural system 10 may work with light soils when the weight of the row unit 20 itself is excessive for the amount of downforce needed.

As the row unit 20 travels across a field, the ground engaging tool 30 excavates a trench into the soil, and seeds are deposited into the trench. As will be appreciated, seeds may be deposited within the excavated trench via a seed tube 32 along with fertilizer via a fertilizer tube 34 that extend between a metering system and the soil. The seed tube exit may be positioned aft of the ground engaging tool 30 and forward of a closing system 36 such that seeds flow into the trench before the trench is closed. The closing system 36 may include a press wheel assembly 38. The press wheel assembly 38 includes a press wheel/packer wheel 40 (e.g., closer) positioned aft of the ground engaging tool 30 and serves to pack soil on top of the seeds in the trench. In the present embodiment, the press wheel assembly 38 includes an arm 42 (e.g., packer arm) that extends between a chassis 44 (e.g., backbone) of the row unit 20 and the press wheel 40. The arm 42 couples to the chassis 44 with a fastener 46 (e.g., a pin, bolt) which forms a pivot point that enables the press wheel assembly 38 to rotate with respect to the chassis 44.

The ability of the press wheel assembly 38 to rotate with respect to the chassis 44 enables the row unit 20 to control the depth of the ground engaging tool 30 by controlling rotation of the arm 42. More specifically, as the arm 42 rotates clockwise in direction 48 the press wheel 40 raises in direction 50. As the press wheel 40 lifts, the chassis 44 lowers in direction 28. Because the ground engaging tool 30 couples to the chassis 44, the ground engaging tool 30 sinks deeper into the soil in direction 28 increasing the depth of the trench. In contrast, if the arm 42 rotates in counterclockwise direction 52, the press wheel 40 is driven down in direction 28 which lifts the chassis 44 and by extension the ground engaging tool 30. As the chassis 44 lifts it raises the ground engaging tool 30 in direction 50 reducing the penetration depth of the ground engaging tool 30. Accordingly, controlling the position of the press wheel 40 controls the penetration depth of the ground engaging tool 30 and thus the depth of the trench. The rotation of the arm 42, and thus the position of the ground engaging tool 30, is controlled with the depth adjustment system 12.

Figure 3:
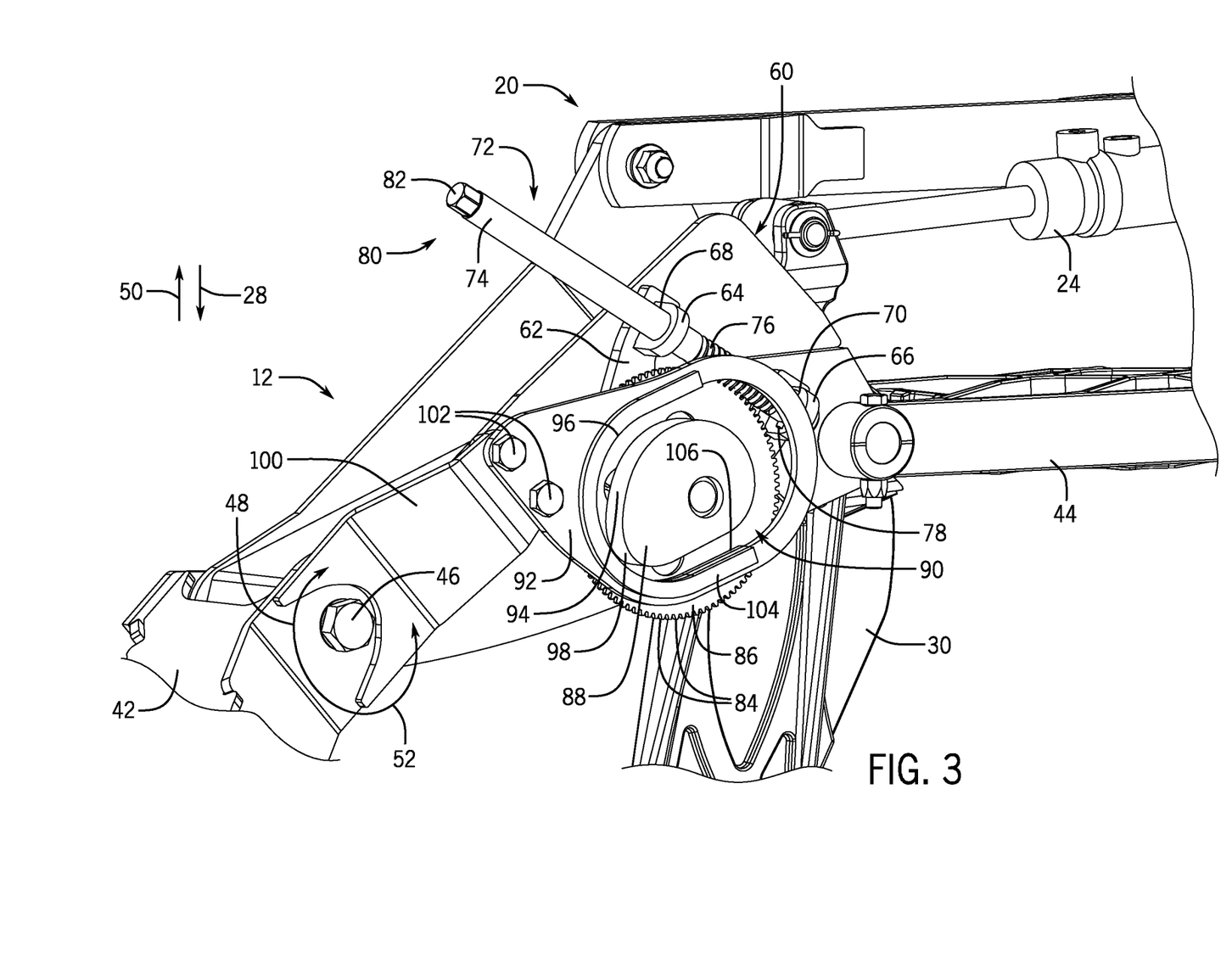
FIG. 3 is a perspective view of an embodiment of a depth adjustment system.

FIG. 3 is a perspective view of an embodiment of the depth adjustment system 12 in FIG. 2. The depth adjustment system 12 couples to the chassis 44 with a mounting system 60. The mounting system includes a plate 62 (e.g., mounting plate) configured to couple to the chassis 44 of the row unit 20. As will be explained below, the plate 62 enables the depth adjustment system 12 to be oriented in different directions to facilitate access to and adjustment of the depth adjustment system 12. The plate 62 includes a first flange 64 and a second flange 66. These flanges 64, 66 include respective apertures 68 and 70 enabling the flanges 64, 66 to receive and support a worm 72. The worm 72 includes a shaft 74 with a threaded section 76. In some embodiments, the threaded section 76 may be placed between the flanges 64, 66. The worm 72 may be held in place with pins 78 that couple to the worm 72 on opposite sides of the flange 66. These pins 78 pass through apertures in the shaft 74 enabling the worm 72 rotate within the flanges 64, 66 while reducing or blocking axial movement of the worm 72 along its longitudinal axis (i.e., retraction of the worm 72 out of the apertures 68, 70). In some embodiments, the pins 78 may be placed on opposite sides of the flange 64 to couple the worm 72 to the plate 62. In still other embodiments, the pins 78 may be placed on opposite sides of both flanges 64 and 66 to reduce or block axial movement of the worm 72 along its longitudinal axis.

In operation, the worm 72 rotates with input from an actuator (e.g., electric, manual, hydraulic, pneumatic). For example, an actuator may couple to a coupling feature 80 at an end 82 of the shaft 74. In some embodiments, the coupling feature 80 may have a hexagonal shape that enables coupling of the worm 72 to an actuator. As the worm 72 rotates, the threaded section 76 engages teeth 84 on a gear 86, which rotates the gear 86. Rotation of the gear 86 in turn rotates a cam 88 coupled to the gear 86. The cam 88 rests within an aperture 90 of a cam follower 92. As the cam 88 rotates within the cam follower 92, a cam surface 94 (i.e., cam profile) of the cam 88 contacts a surface 96 of the cam follower 92. The contact between these surfaces 94 and 96 displaces/moves the cam follower 92. Movement of the cam follower 92 is transmitted to the arm 42 through a flange 100 that couples to the cam follower 92. For example, the flange 100 may couple to the cam follower 92 with fasteners 102 (e.g., 2, 3, 4, or more fasteners). These fasteners 102 may be threaded fasteners such as bolts. As the cam 88 rotates and displaces the cam follower 92, the motion is transmitted to the arm 42 through the flange 100. The arm 42 in turn rotates about the fastener 46 (i.e., pivot point) in directions 48 or 52.

As explained above, as the arm 42 rotates clockwise about the fastener 46 in direction 48 the press wheel 40 lifts in direction 50. As the press wheel 40 lifts, the chassis 44 lowers in direction 28. Because the ground engaging tool 30 couples to the chassis 44, the ground engaging tool 30 sinks deeper into the soil in direction 28 increasing the depth of the trench. In contrast, if the arm 42 rotates in counterclockwise direction 52, the press wheel 40 is driven down in direction 28 which lifts the chassis 44 and by extension the ground engaging tool 30. As the chassis 44 lifts it raises the ground engaging tool 30 in direction 50 reducing the penetration depth of the ground engaging tool 30. The amount of displacement of the cam follower 92 depends on shape of the cam 88 (i.e., cam profile) and/or the cam follower 92. As illustrated, the cam 88 includes a lobe 98 that maximizes displacement of the cam follower 92. In some embodiments, the cam 88 may include additional lobes 98 (e.g., 1, 2, 3, or more) to control displacement of the cam follower 92. In some embodiments, the cam follower 92 may include lips 104 and 106 to increase the surface area in contact with the cam 88.

Figure 4:
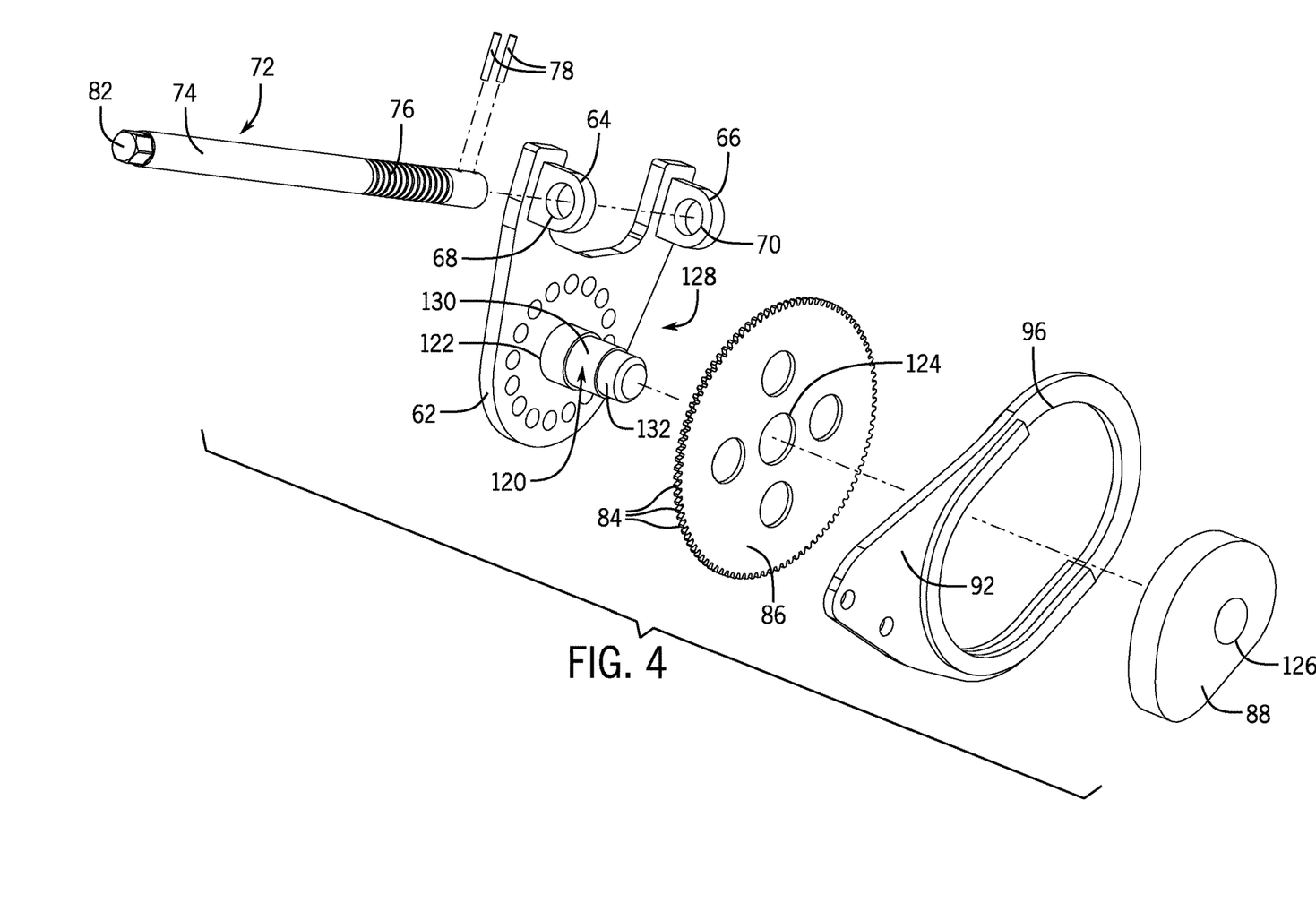
FIG. 4 is a perspective exploded view of an embodiment of a depth adjustment system.

FIG. 4 is a perspective exploded view of an embodiment of a depth adjustment system 12. As illustrated, the depth adjustment system 12 includes a shaft 120 that rests and rotates within an aperture 122 of the mounting plate 62. The shaft 120 couples to (e.g., welded to) and supports both the gear 86 and the cam 88. The shaft 120 couples to the gear 86 through an aperture 124 in the gear 86. The shaft 120 also couples to the cam 88 through an aperture 126 in the cam 88. In order to space the gear 86 and the cam 88 from the each other along the shaft 120, the shaft 120 includes multiple sections 128 that have different diameters. As illustrated, the shaft 120 includes a first section 130 at a first diameter and a second section 132 at a second diameter. The diameter of the first section 130 defines a diameter that corresponds to the diameter of the aperture 124 in the gear 86 enabling the shaft 120 to receive the gear 86. However, the diameter of the first section 130 is larger than the diameter of the aperture 126 in the cam 88. This difference blocks the cam 88 from sliding over the first section and contacting the gear 86. In some embodiments, the length of the first section 130 may be greater than a width of the gear 86 to reduce or block contact between the gear 86 and the cam 88. In order to receive the cam 88, the second section 132 defines a diameter that corresponds to the diameter of the aperture 126 in the cam 88. It should be understood that in some embodiments, the shaft 120 may not have different diameters.

Figure 5:
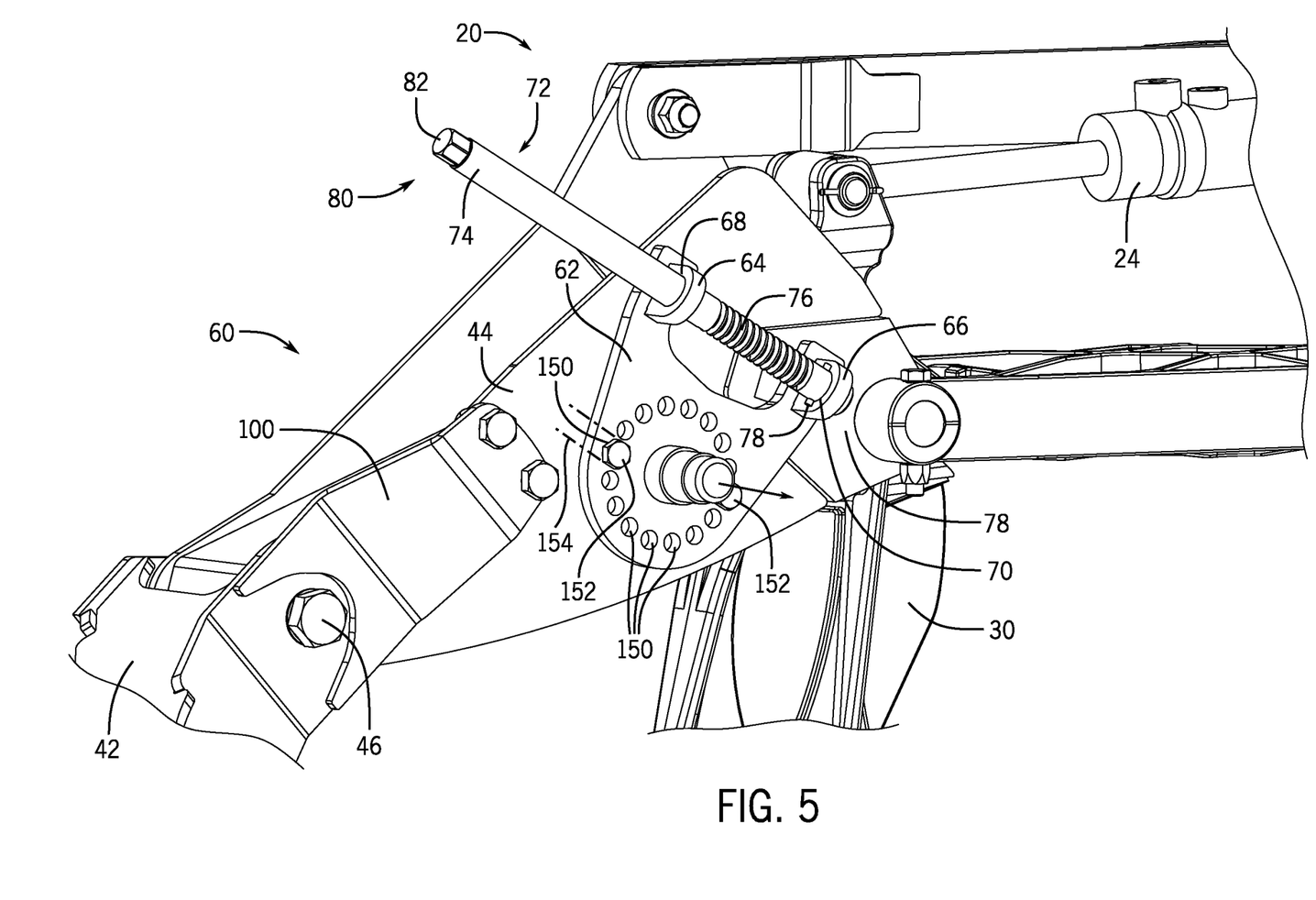
FIG. 5 is a perspective view of an embodiment of a mount system coupled to a row unit.

FIG. 5 is a perspective view of an embodiment of a mount system 60 coupled to the row unit 20. As explained above, the depth adjustment system 12 couples to the chassis 44 with a mounting system 60. The mounting system 60 includes the plate 62 (e.g., mounting plate) configured to couple to the chassis 44 of the row unit 20. The plate 62 includes a plurality of apertures 150. These apertures 150 may be arranged in a circle about the aperture 122 that receives the shaft 120. The apertures 150 enable fasteners 152 (e.g., threaded fasteners) to couple the plate 62 to the chassis 44. More specifically, alignment of two or more apertures 150 with apertures 154 in the chassis 44 enables the fasteners 152 to couple the plate 62 to the chassis 44. Once coupled to the chassis 44, the plate 62 orients the shaft 74 of the worm 72 in a particular angle with respect to the chassis 44, row unit 20, soil, etc. By including multiple apertures 150 about the aperture 122, the plate 62 and by extension the shaft 74 may be oriented in different positions relative to the chassis 44, row unit 20, soil, etc. This may facilitate operator access to the worm 72 in order to change the penetration depth of the ground engaging tool 30 with the depth adjustment system 12. As explained above, the implement 16 may include multiple rows of row units 20. Accordingly, each plate 62 of each depth adjustment system 12 may be respectively oriented to facilitate operator access to the worms 72. For example, the implement 16 may include three rows of row units 20. Each of these rows may orient all of the worms 72 in a specific direction that differs from the worms 72 in neighboring rows in order to facilitate access and adjustment.

Figure 6:
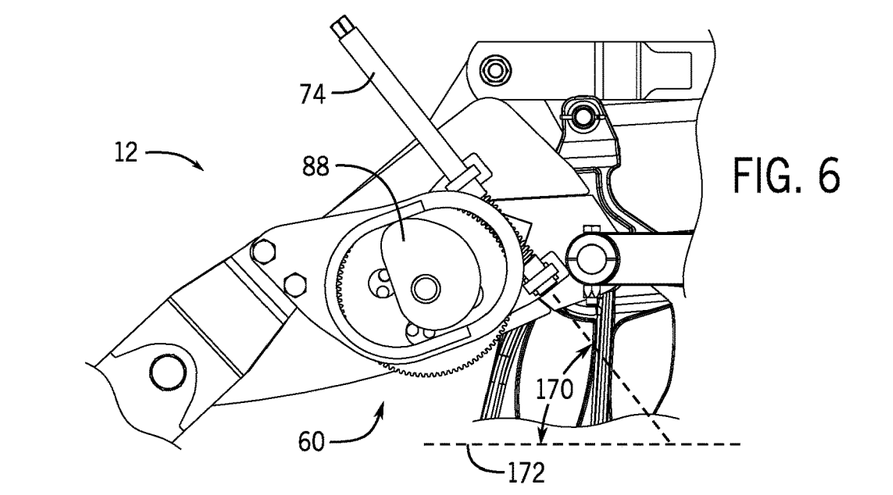
FIG. 6 is a side view of an embodiment of a depth adjustment system in a first position.
Figure 7:
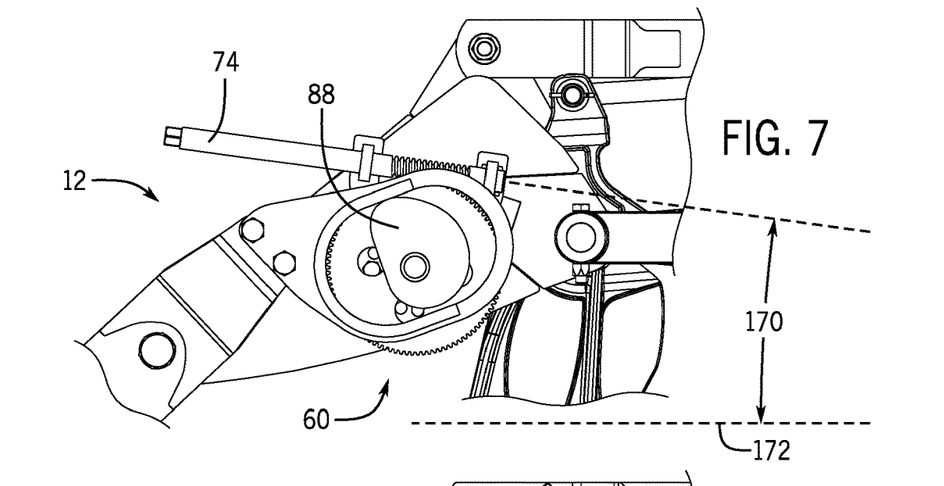
FIG. 7 is a side view of an embodiment of a depth adjustment system in a second position.
Figure 8:
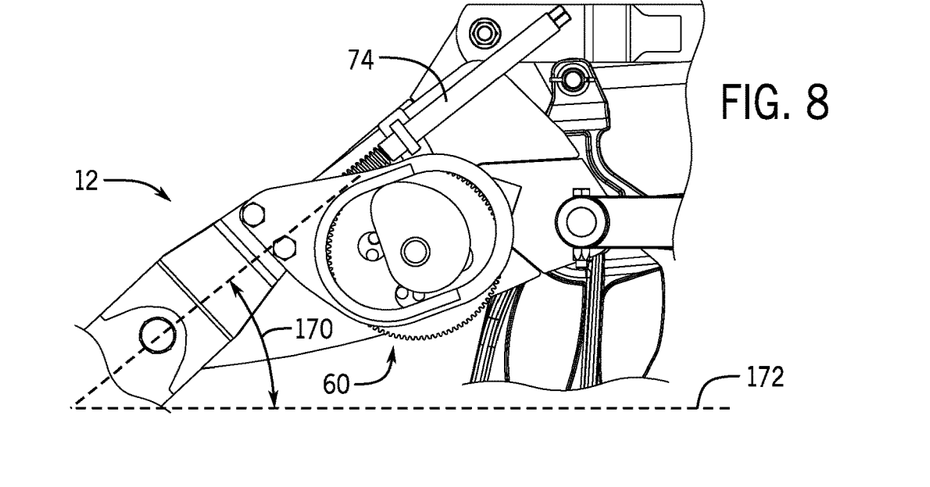
FIG. 8 is a side view of an embodiment of a depth adjustment system in a third position.

FIGS. 6-8 are side views of an embodiment of a depth adjustment system 12 in three different positions. More specifically, FIGS. 6-8 illustrate how the mount system 60 changes the angle 170 in response to the position of the plate 62. The angle 170 may be measured/formed between the longitudinal axis of the shaft 74 and the ground/soil 172, chassis, row unit, etc. As explained above, the plate 62 includes multiple apertures 150 that enable the plate 62 to rotate and/or couple to the chassis 44 with the fasteners 152 in different positions. By changing the position of the plate 62 the depth adjustment system 12 changes the position/orientation of the shaft 74 to facilitate operator access to the shaft 74 for adjustments (e.g., changing the depth of the trench). As illustrated in FIGS. 6 and 7, the shaft 74 is positioned at two different angles 170 with that shaft 74 generally pointed towards a rear of the row unit 20. In FIG. 8, the plate 62 has been rotated so that the shaft 74 generally points toward the front of the row unit 20. In some embodiments, the orientation of the worm 72 may be reversed by inserting the worm 72 first through the flange 66 and then through the flange 64 in order to point the shaft 74 towards the front of the row unit 20; instead of rotating the plate 62.

Figure 9:
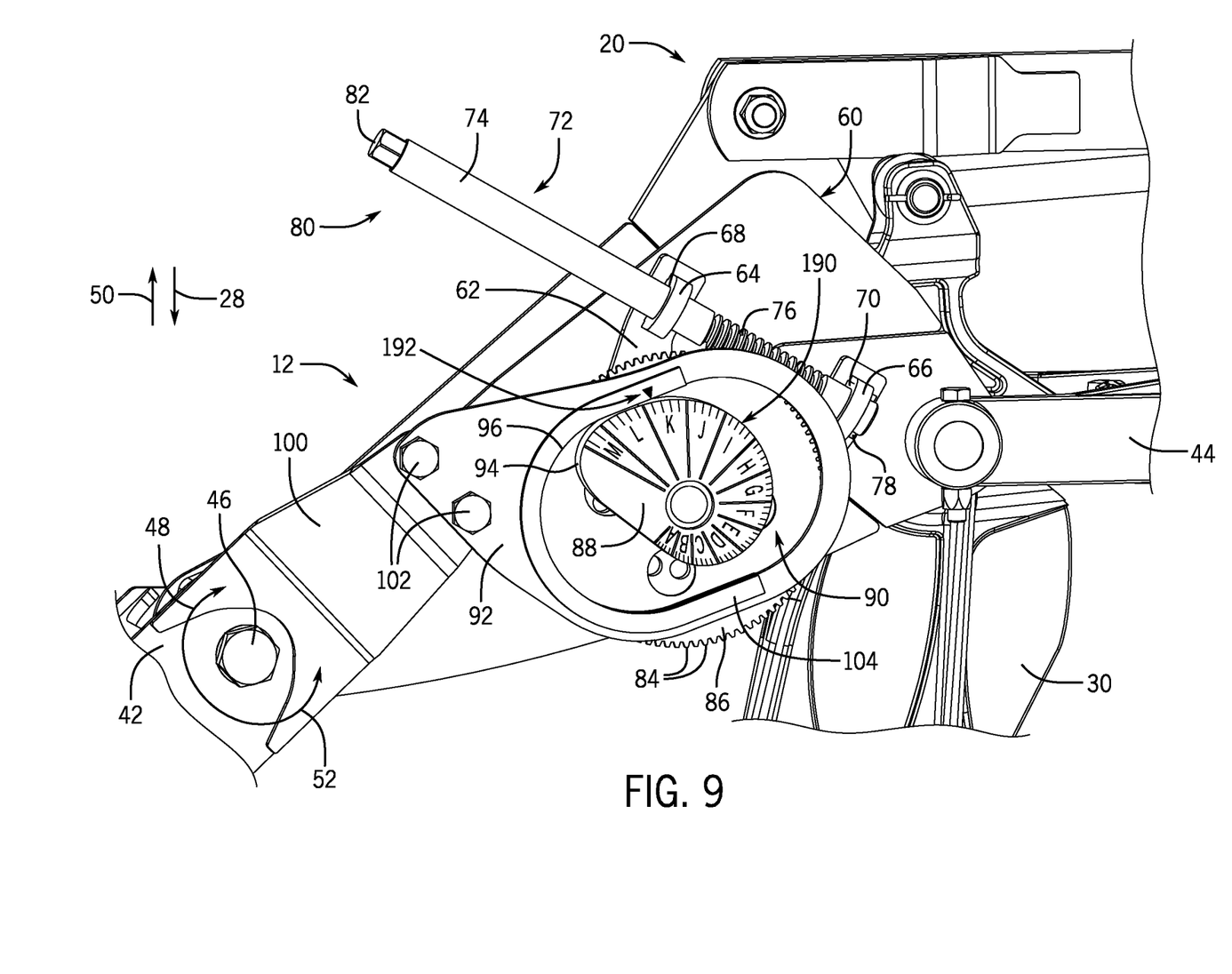
FIG. 9 is a partial side view of an embodiment of a depth adjustment system.

FIG. 9 is a partial side view of an embodiment of a depth adjustment system 12. In some embodiments, the depth adjustment system 12 may include markings on the cam 88 and cam follower 92 that enable an operator to determine the relative depth or penetration of the ground engaging tool 30 relative to the surface of the soil. For example, the cam 88 may include one or more markings 190 (e.g., letters, words, numbers, lines, or combinations thereof) that indicate a penetration depth of the ground engaging tool 30. Likewise, the cam follower 92 may include one or more markings 192 (e.g., letters, words, numbers, lines, or combinations thereof) that facilitates adjustment of the depth adjustment system 12. For example, FIG. 9 illustrates a cam 88 with markings 190 in the form of letters separated by lines. The letters and lines 190 indicate a particular depth of the ground engaging tool 30 when aligned with the marking 192 on the cam follower 92. In FIG. 9 the marking on the cam follower 92 is an arrow. These markings 190 and 192 enable an operator to rapidly check the position of the ground engaging tool 30 relative to the surface of the soil and to adjust if needed depending on the various soil conditions and the type of seed and/or fertilizer being deposited. For example, the markings 190 may indicate optimal planting of a particular type of seed at a depth "L," while another seed may be optimally planted at a depth "F." In some embodiments, the markings 190 may refer to optimal trench depth depending on the type of soil. For example, the letter "M" may refer to an optimal penetration depth (i.e., trench depth) for compact soils, while "A" may be indicated an optimal penetration depth for loose soils.

Figure 10:
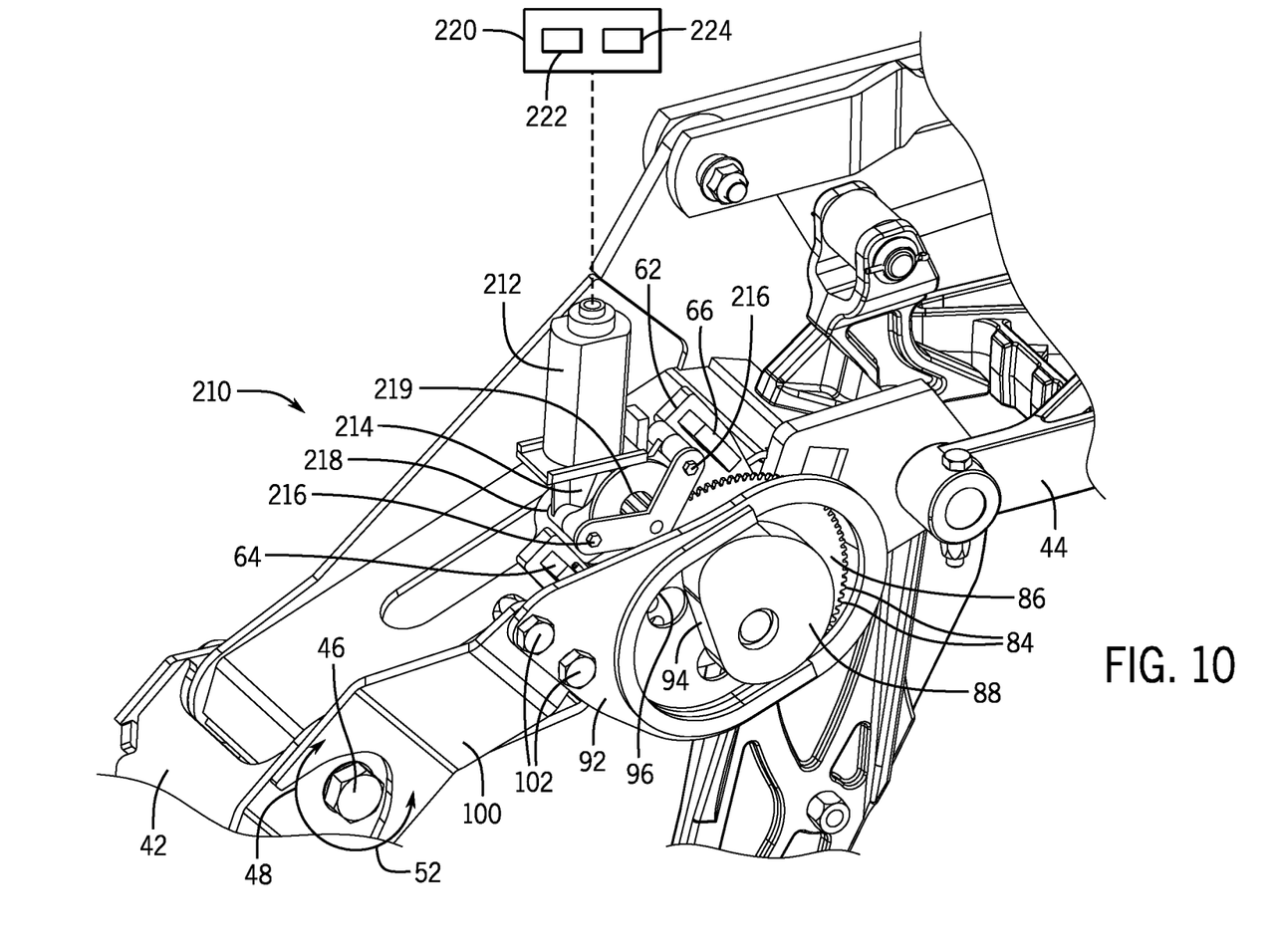
FIG. 10 is a perspective view of an embodiment of a depth adjustment system with an actuator.

FIG. 10 is a perspective view of an embodiment of a depth adjustment system 210 with an actuator 212 (e.g., electric, pneumatic, hydraulic). The actuator 212 is supported by a mounting bracket 214 that couples to the mounting plate 62 with fasteners 216 (e.g., threaded fasteners) that extend through apertures 218 (e.g., mounting bracket apertures) in the mounting plate 62. As illustrated, the mounting plate 62 is able to support both the actuator 212 and the shaft 74 seen in FIG. 3 depending on the configuration. That is, the mounting plate 62 includes the flanges 64 and 66 which are capable of supporting the shaft 74 with the threaded section 76. The mounting plate 62 may therefore be referred to as a hybrid mounting plate because it can support the actuator 212 or the shaft 74.

In operation, the actuator 212 rotates the pinion gear 219. As the pinion gear 219 rotates, the teeth on the pinion gear 219 engage the teeth 84 on the gear 86. Rotation of the gear 86 in turn rotates the cam 88 coupled to the gear 86. As the cam 88 rotates within the cam follower 92, the cam surface 94 (i.e., cam profile) of the cam 88 contacts the surface 96 of the cam follower 92. The contact between these surfaces 94 and 96 displaces/moves the cam follower 92. Movement of the cam follower 92 is transmitted to the arm 42 through the flange 100 that couples to the cam follower 92. As the cam 88 rotates and displaces the cam follower 92, the motion is transmitted to the arm 42 through the flange 100. The arm 42 in turn rotates about the fastener 46 (i.e., pivot point) in directions 48 or 52. As explained above, the cam surface or profile 94 varies in distance from the shaft 120. Accordingly, as the cam 88 rotates within the cam follower 92, the motion is transmitted to the arm 42. As the arm 42 rotates about the fastener 46 (e.g., the pivot point) the arm 42 lowers or raises the chassis 44 and by extension the penetration depth of the ground engaging tool 30.

The actuator 212 may be controlled with a controller 220 that includes a processor 222 and a memory 224. For example, the processor 222 may be a microprocessor that executes software to control the various actuators on the row unit 20 in response to feedback from sensors or information provided by an operator (e.g., seed type, soil type, penetration depth). The processor 222 may include multiple microprocessors, one or more "general-purpose" microprocessors, one or more special-purpose microprocessors, and/or one or more application specific integrated circuits (ASICs), field-programmable gate arrays (FPGAs), or some combination thereof. For example, the processor 222 may include one or more reduced instruction set (RISC) processors.

The memory 224 may include a volatile memory, such as random access memory (RAM), and/or a nonvolatile memory, such as read-only memory (ROM). The memory 224 may store a variety of information and may be used for various purposes. For example, the memory 224 may store processor executable instructions, such as firmware or software, for the processor 222 to execute. The memory may include ROM, flash memory, a hard drive, or any other suitable optical, magnetic, or solid-state storage medium, or a combination thereof. The memory may store data, instructions, and any other suitable data. In operation, the processor 222 executes instructions on the memory 224 to control the actuator 212 to change the depth of the trench formed by the ground engaging tool 30.

While only certain features and embodiments of the present disclosure have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. An agricultural implement system, comprising:
an agricultural implement, comprising:
a row unit;
an opener coupled to the row unit, wherein the row unit is configured to form a trench in soil;
a packer wheel, configured to pass over the trench and to pack the soil;
a depth adjustment system coupled to the row unit and configured to adjust a depth of the opener relative to a surface of the soil;
a mount system configured to couple to the row unit and support the depth adjustment system, the mount system comprises:
a plate configured to couple to the row unit in a plurality of positions to change an orientation of the depth adjustment system relative to the row unit, wherein the plate defines a plurality of apertures, and wherein the plurality of apertures enable the plate to couple to the row unit in the plurality of positions.

2. The system of claim 1, wherein the plurality of apertures are arranged about a diameter on the plate.

3. The system of claim 1, comprising a plurality of fasteners configured to couple the plate to the row unit.

4. The system of claim 1, wherein the plate defines a first face and a second face wherein the second face comprises a first flange and a second flange, and wherein the first and second flanges are configured to support a worm.

5. The system of claim 1, wherein the plate defines a first mounting bracket aperture and a second mounting bracket aperture, and wherein a mounting bracket is configured to couple to the plate with bolts that extend into the first mounting bracket aperture and the second mounting bracket aperture.

6. The system of claim 1, wherein the plate defines a shaft aperture configured to receive a shaft coupled to a cam and a gear of the depth adjustment system.

7. The system of claim 6, comprising the shaft, wherein the shaft comprises a plurality of sections with different diameters.

* * * * *